United States Patent
Lee et al.

(10) Patent No.: US 9,183,615 B2
(45) Date of Patent: Nov. 10, 2015

(54) DISPLAY DEVICE AND DRIVING METHOD THEREOF

(71) Applicant: SAMSUNG DISPLAY CO., LTD., Yongin, Gyeonggi-do (KR)

(72) Inventors: Ji Gong Lee, Suwon-si (KR); Sang Jin Pak, Cheonan-si (KR); Hideo Yoshimura, Cheonan-si (KR); Sang Kwon Ha, Cheonan-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 269 days.

(21) Appl. No.: 13/830,734

(22) Filed: Mar. 14, 2013

(65) Prior Publication Data
US 2014/0085322 A1   Mar. 27, 2014

(30) Foreign Application Priority Data

Sep. 21, 2012   (KR) .......................... 10-2012-0105321

(51) Int. Cl.
| | |
|---|---|
| G09G 5/36 | (2006.01) |
| G06T 1/60 | (2006.01) |
| G09G 5/18 | (2006.01) |
| G09G 3/20 | (2006.01) |
| G09G 3/32 | (2006.01) |

(52) U.S. Cl.
CPC .. *G06T 1/60* (2013.01); *G09G 5/18* (2013.01); *G09G 3/2022* (2013.01); *G09G 3/3233* (2013.01); *G09G 2360/18* (2013.01)

(58) Field of Classification Search
CPC ................. G09G 3/2022; G09G 2320/0266; G09G 3/2029; G09G 2310/0205; G09G 3/2025; G09G 3/3674
USPC .......................................................... 345/545
See application file for complete search history.

(56) References Cited

U.S. PATENT DOCUMENTS

| | | | |
|---|---|---|---|
| 2004/0135748 A1* | 7/2004 | Yoon et al. ...................... | 345/60 |
| 2005/0088370 A1* | 4/2005 | Shigeta et al. .................. | 345/60 |

(Continued)

FOREIGN PATENT DOCUMENTS

| | | |
|---|---|---|
| KR | 10-2006-0065374 A | 6/2006 |
| KR | 10-2008-0062492 A | 7/2008 |

(Continued)

OTHER PUBLICATIONS

Korean Patent Abstracts, Publication No. 10-2008-0069483 A, dated Jul. 28, 2008, for corresponding Korean Patent No. 10-0885913, 1 page.

*Primary Examiner* — Hau Nguyen
(74) *Attorney, Agent, or Firm* — Christie, Parker & Hale, LLP (57) ABSTRACT

A display device includes a driver connected to a display panel and transmitting scan signals or data signals to the display panel, a frame memory connected to the driver, storing image data and transmitting at least some of the image data to the driver, and a controller connected to the driver and the frame memory, generating a control signal and transmitting the control signal to the driver or the frame memory, wherein each of the sub-fields includes an address period in which the scan signals are transmitted to the respective pixel rows, the controller transmits the control signal to the driver to transmit the scan signals to the pixel rows during a current frame such that the scan signals corresponding to the current frame are transmitted after, among the image data corresponding to the current frame, the image data corresponding to the pixel rows are stored in the frame memory.

21 Claims, 6 Drawing Sheets (56) References Cited

U.S. PATENT DOCUMENTS

2008/0079667 A1* 4/2008 Nagao et al. .................. 345/60
2011/0018857 A1* 1/2011 Lai et al. ...................... 345/213

FOREIGN PATENT DOCUMENTS

KR  10-2008-0079864 A  9/2008
KR  10-0885913  2/2009

* cited by examiner

DISPLAY DEVICE AND DRIVING METHOD THEREOF

CROSS-REFERENCE TO RELATED APPLICATION

This application claims priority to and the benefit of Korean Patent Application No. 10-2012-0105321 filed on Sep. 21, 2012 in the Korean Intellectual Property Office, the disclosure of which is incorporated herein by reference in its entirety.

BACKGROUND

1. Field

The following description relates to a display device and a driving method thereof, and more particularly, to a display device and a driving method thereof, which can prevent or protect a tearing effect from occurring.

2. Description

Along with development of information communication technology and demand of diversified information society, there is increasing demand for displays. Instead of cathode ray tube (CRT) display devices, flat panel display devices (FPDs)are being developed according to the demand for compact and power-saving displays. Examples of the currently widely used FPD include an electroluminescent display (ELD), a liquid crystal display (LCD), such as TFT-LCD or TN/STN LCD, a plasma display device, and so on.

In the FPD, gray scales may be represented in an analog or digital manner. In the digital manner, the gray scales are represented by dividing one frame into a plurality of sub-fields and making pixels emit light or not during a period corresponding to each of the sub-fields. That is, according to the digital gray scale representing method, the gray scales are represented by adjusting the emission period of pixels within one frame.

The FPD may include a frame memory storing image data to be displayed. When a speed of writing the image data in the frame memory is different from a speed of reading the image data from the frame memory, the FPD may emit light from some of the plurality of pixels according to image data of the previous frame, and emit light from the other of the plurality of pixels according to image data of the current frame. In other words, a phenomenon that an image appears to be torn may occur, which is referred to as a "tearing effect."

SUMMARY

An aspect of an embodiment of the present invention is directed toward a display device and a driving method thereof, which can prevent (or protect from) a tearing effect.

An aspect of an embodiment of the present invention is directed toward a display device and a driving method thereof, which can prevent (or protect) a tearing effect using only a single frame memory without using additional frame memory.

The above and other objects of the present invention will be described in or be apparent from the following description of the exemplary embodiments.

According to an embodiment of the present invention, there is provided a display device including: a display panel including a plurality of pixel rows; a driver connected to the display panel and transmitting scan signals or data signals to the display panel; a frame memory connected to the driver, storing externally received image data and transmitting at least some of the image data to the driver; and a controller connected to the driver and the frame memory, generating a control signal and transmitting the control signal to the driver or the frame memory, wherein each of the sub-fields includes an address period in which the scan signals are transmitted to the respective pixel rows, and the controller transmits the control signal to the driver to transmit the scan signals to the pixel rows during a current frame such that the scan signals corresponding to the current frame are transmitted after, among the image data corresponding to the current frame, the image data corresponding to the pixel rows are stored in the frame memory.

The controller may transmit the control signal to the driver such that a total time taken for the scan signals to be transmitted to all of the plurality of pixel rows during the address period of the sub-field arranged earliest during the current frame, among the plurality of sub-fields, is longer than or equal to a time taken for the image data corresponding to the current frame to be all stored in the frame memory.

The time taken for the image data corresponding to the current frame to be all stored in the frame memory may be shorter than or equal to half of the current frame.

The time taken for the image data corresponding to the current frame to be all stored in the frame memory may be shorter than or equal to one fourth of the current frame.

In one embodiment, the data signal is transmitted from the driver to the display panel for the address period of each of the sub-fields; the plurality of sub-fields include first to nth sub-fields, where n is a natural number of 2 or greater, arranged according to the timing sequence within the current frame; and the data signal transmitted to the display panel during the address period of the first sub-field and the data signal transmitted to the display panel during the address period of the nth sub-field are equal to each other.

The data signal may be transmitted from the driver to the display panel for the address period of each of the sub-fields; and one of m data bits, where m is a natural number of 2 or greater, may be transmitted from the driver to the display panel.

In one embodiment, the plurality of sub-fields include (m+1) sub-fields, the (m+1) sub-fields include first to (m+1)th sub-fields arranged according to the timing sequence within the current frame, and the data bit transmitted to the display panel during the address period of the first sub-field and the data bit transmitted to the display panel during the address period of the nth sub-field are equal to each other.

In one embodiment, the m data bits have weights, respectively, and the data bit transmitted to the display panel during the address period of the first sub-field and the data bit transmitted to the display panel during the address period of the (m+1)th sub-field have the highest weight among the m data bits.

The m data bits may include first to mth data bits, and an ith data bit, where 1<=i<=m, among the first to mth data bits, has a weight of $2^{i-1}$.

In one embodiment, each of the pixel rows includes one or more pixels, and each of the first to (m+1)th sub-fields further includes a light emission period in which the pixels emit light or not according to the data bit transmitted to the display panel during the address period included in each of the first to (m+1)th sub-fields.

A sum of the length of the light emission period of the first sub-field and the length of the light emission period of the (m+1)th sub-field for each of the pixel rows may be equal to each other.

The length of the light emission period of the first sub-field or the length of the light emission period of the (m+1)th sub-field for each of the pixel rows may be different from each other.

In one embodiment, the m data bits have weights, respectively, lengths of the light emission periods of the second to mth sub-fields are proportional to weights of the data bits transmitted to the display panel during the address periods included in the second to mth sub-fields, and a sum of the lengths of the light emission periods of the first and (m+1)th sub-fields is proportional to the weight of the data bit transmitted to the display panel during the address period included in the first sub-field or the (m+1)th sub-field.

The data bit transmitted to the display panel during the address period of the first sub-field and the data bit transmitted to the display panel during the address period of the (m+1)th sub-field may have the highest weight among the m data bits.

According to another embodiment of the present invention, there is provided a driving method of a display device, the driving method including a display device for displaying an image by dividing one frame into a plurality of sub-fields, the display device including: a display panel including a plurality of pixel rows; a driver connected to the display panel and transmitting scan signals or data signals to the display panel; a frame memory connected to the driver, storing externally received image data and transmitting at least some of the image data to the driver; and a controller connected to the driver and the frame memory, generating a control signal and transmitting the control signal to the driver or the frame memory, wherein the controller transmits the control signal to the driver such that a total time taken for the scan signals to be transmitted to all of the plurality of pixel rows during an address period of the sub-field arranged earliest during a current frame, among the plurality of sub-fields, is longer than or equal to a time taken for the image data corresponding to the current frame to be all stored in the frame memory.

All of the scan signals transmitted during the current frame may start to be transmitted to the display panel after the frame memory starts to receive the image data corresponding to the current frame.

The time taken for the image data corresponding to the current frame to be all stored in the frame memory may be shorter than or equal to half of the current frame.

In one embodiment, the data signal is transmitted from the driver to the display panel for the address period of each of the sub-fields; one of m data bits, where m is a natural number of 2 or greater, is transmitted from the driver to the display panel; the plurality of sub-fields include first to (m+1)th sub-fields, where m is a natural number of 2 or greater, arranged according to the timing sequence within the current frame; and the data signal transmitted to the display panel during the address period of the first sub-field and the data signal transmitted to the display panel during the address period of the (m+1)th sub-field are equal to each other.

In one embodiment, each of the pixel rows includes one or more pixels, each of the first to (m+1)th sub-fields further includes a light emission period in which the pixels emit light or not according to the data bit transmitted to the display panel during the address period included in each of the first to (m+1)th sub-fields, and a sum of the length of the light emission period of the first sub-field and the length of the light emission period of the (m+1)th sub-field for each of the pixel rows is equal to each other.

In one embodiment, the m data bits have weights, respectively; and lengths of the light emission periods of the second to mth sub-fields are proportional to weights of the data bits transmitted to the display panel during the address periods included in the second to mth sub-fields; and a sum of the lengths of the light emission periods of the first and (m+1)th sub-fields is proportional to the weight of the data bit transmitted to the display panel during the address period included in the first sub-field or the (m+1)th sub-field; and the data bit transmitted to the display panel during the address period of the first sub-field and the data bit transmitted to the display panel during the address period of the (m+1)th sub-field have the highest weight among the m data bits.

According to an embodiment of the present invention, in the display device and the driving method thereof, an image tearing effect can be prevented.

Also, according to an embodiment of the present invention, in the display device and the driving method thereof, a tearing effect can be prevented using only a single frame memory without using additional frame memory.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION

Advantages and features of the present invention and methods of accomplishing the same may be understood more readily by reference to the following detailed description of exemplary embodiments and the accompanying drawings. The present invention may, however, be embodied in many different forms and should not be construed as being limited to the embodiments set forth herein. Rather, these embodiments are provided so that this disclosure will be thorough and complete and will fully convey the concept of the invention to those skilled in the art, and the present invention will only be defined by the appended claims. Thus, in some embodiments, well-known structures and devices are not shown in order not to obscure the description of the invention with unnecessary detail. Like numbers refer to like elements throughout. In the drawings, the thickness of layers and regions are exaggerated for clarity.

It will be understood that when an element or layer is referred to as being "on" or "connected to" another element or layer, it can be directly on or connected to the other element or layer, or one or more intervening elements or layers may be present therebetween. In contrast, when an element is referred to as being "directly on" or "directly connected to" another element or layer, there is no intervening element or layer present therebetween. As used herein, the term "and/or" includes any and all combinations of one or more of the associated listed items.

Spatially relative terms, such as "below," "beneath," "lower," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures.

Embodiments described herein will be described referring to plan views and/or cross-sectional views by way of ideal schematic views of the invention. Accordingly, the exemplary views may be modified depending on manufacturing technologies and/or tolerances. Therefore, the embodiments of the invention are not limited to those shown in the views, but include modifications in configuration formed on the basis of manufacturing processes. Therefore, regions exemplified in figures have schematic properties and shapes of regions shown in figures exemplify specific shapes of regions of elements and do not limit aspects of the invention.

Hereinafter, a display device according to an embodiment of the present invention and a driving method thereof will be described with reference to the accompanying drawings.

The display device according to an embodiment of the present invention may be implemented by various kinds of display devices, including an organic light emitting display (OLED) device, a plasma display panel (PDP), a field emission display, and so on. In the following description, it is assumed that the display device is implemented by the OLED device, but aspects of the present invention are not limited thereto. The driving method according to the embodiment of the present invention may be applied to various kinds of display devices.

Figure 1:
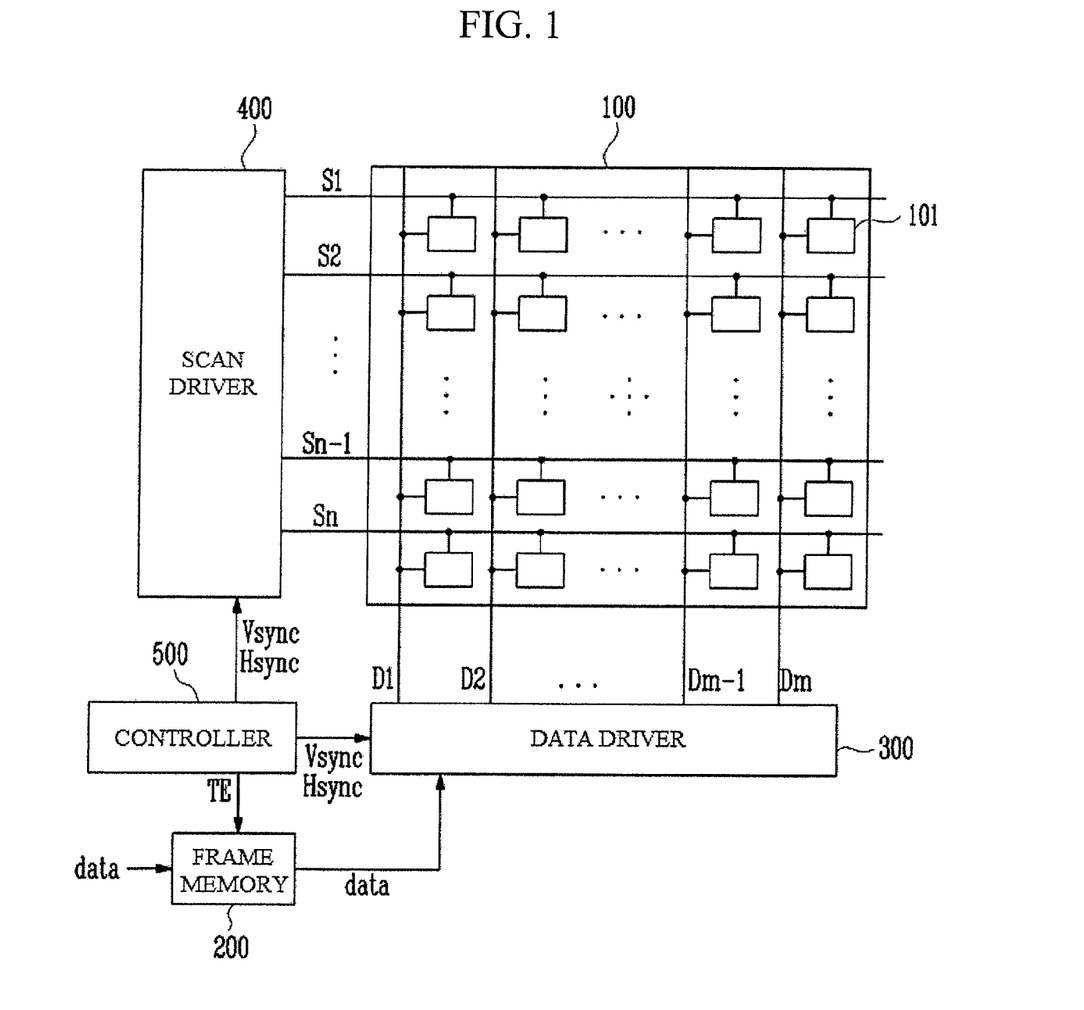
FIG. 1 is a circuit view illustrating a configuration of a display device according to an embodiment of the present invention.

FIG. 1 is a circuit view illustrating a configuration of a display device according to an embodiment of the present invention. Referring to FIG. 1, the display device includes: a display panel 100 including one or more pixels 101; a scan driver 400 connected to the display panel 100 through scanning lines S1 to Sn, generating scan signals and transmitting the same to the display panel 100; a data driver 300 connected to the display panel 100 through data lines D1 to Dm, generating data signals and transmitting the same to the display panel 100; a frame memory 200 connected to the data driver 300, storing externally received image data and transmitting at least some of the image data to the data driver 300; and a controller 500 connected to the scan driver 400, the data driver 300 and the frame memory 200, generating a control signal and transmitting the same to the scan driver 400, the data driver 300 or the frame memory 200.

The display panel 100 may include one or more pixels 101. In a case where the display panel 100 includes a plurality of pixels 101, the pixels 101 may be arranged in a two-dimensional array of n rows and m columns.

The pixels 101 may be connected to the scanning lines S1 to Sn. The same number of scanning lines S1 to Sn as that of rows in an array of the pixels 101 may be arranged. The respective scanning lines S1 to Sn may be connected to the respective rows in the array of the pixels 101 in a one-to-one corresponding relationship. That is, one of the scanning lines S1 to Sn may be connected to all of the pixels 101 included in one row of the array of the pixels 101.

The pixels 101 may be connected to the data lines D1 to Dm. The same number of data lines D1 to Dm as that of columns in the array of the pixels 101 may be arranged. The respective data lines D1 to Dm may be connected to the respective columns in the array of the pixels 101 in a one-to-one corresponding relationship. That is, one of the data lines D1 to Dm may be connected to all of the pixels 101 included in one column of the array of the pixels 101.

The pixels 101 may emit light according to the scan signals transmitted through the scanning lines S1 to Sn connected to the pixels 101, the data signals transmitted through the data lines D1 to Dm connected to the pixels 101, a first power supply ELVDD that is received from the outside, and a second power supply ELVSS that is received from the outside.

Figure 2:
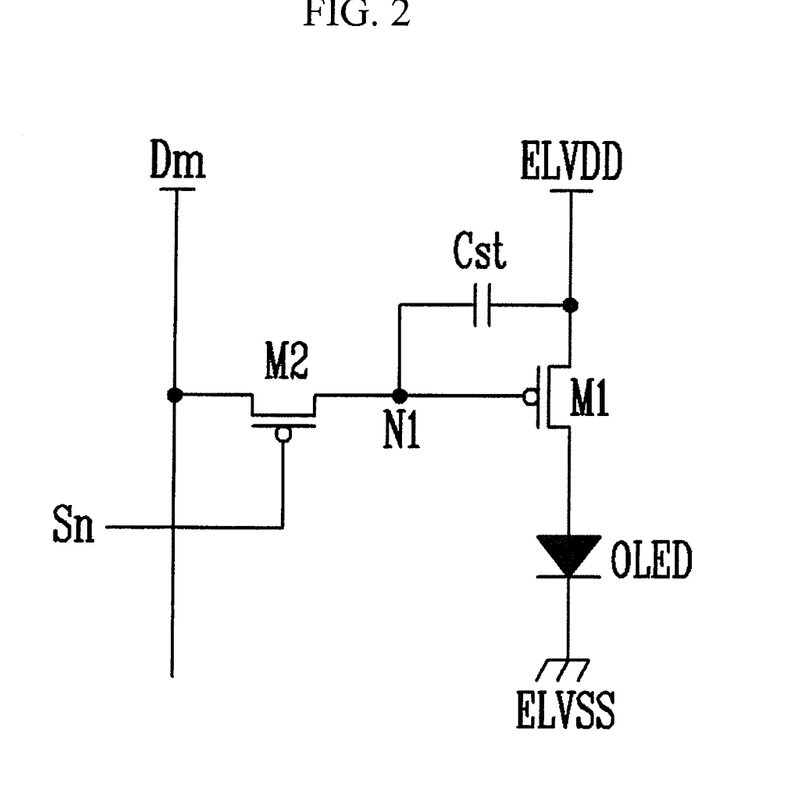
FIG. 2 is a circuit view illustrating a configuration of a pixel shown in FIG. 1.

FIG. 2 is a circuit view illustrating a configuration of a pixel (101) shown in FIG. 1. Referring to FIG. 2, the pixel 101 may include a first transistor M1 including a first electrode, a second electrode and a gate electrode, a second transistor M2 including a first electrode, a second electrode and a gate electrode, a capacitor Cst having one end and another end, and an organic light emitting diode (OLED) having one end and another end. The first transistor M1 and the second transistor M2 may be PMOS (p-channel metal oxide semiconductor) transistors or NMOS (n-channel metal oxide semiconductor) transistors. In the following description, it is assumed that the first transistor M1 and the second transistor M2 are both PMOS transistors.

The second transistor M2 may be turned on in response to the scan signals transmitted through the scanning lines S1 to Sn. If the second transistor M2 is turned on, the data signals transmitted through the data lines D1 to Dm may fill the capacitor Cst. The capacitor Cst maintains a voltage of the gate electrode of the first transistor M1. Therefore, the capacitor Cst may allow the intensity of current flowing from the first electrode to the second electrode of the first transistor M1 to be maintained at a constant level.

If the current flows from the first electrode to the second electrode of the first transistor M1, it may flow in the OLED connected between the first transistor M1 and the second power supply ELVSS. If the current flows in the OLED, the OLED may emit light.

Referring back to FIG. 1, the scan driver 400 may be connected to the display panel 100 through the scanning lines S1 to Sn. The scan driver 400 may generate scan signals according to the control signal transmitted from the controller 500 and then transmit the same to the display panel 100.

The data driver 300 may be connected to the display panel 100 through the data lines. The data driver 300 may generate the data signals according to the control signal transmitted from the controller 500. The data driver 300 may generate the data signals based on the image data transmitted from the frame memory 200. The data driver 300 may transmit the generated data signal to the display panel 100.

The frame memory 200 may be connected to the data driver 300. The frame memory 200 may store the externally received image data and may provide at least some of the image data to the data driver 300.

The frame memory 200 may receive image data from the outside according to the control signal transmitted from the controller 500 and may store the received image data. The frame memory 200 may have a memory size enough to store the image data corresponding to at least one frame. The frame memory 200 may receive the image data corresponding to each frame from the outside for each frame and may store the received image data.

For example, it is assumed that an image corresponding to one frame includes n rows from first to nth rows. The frame memory 200 may sequentially receive the first to nth image data and may store the same.

The image data stored in the frame memory 200, specifically the image data corresponding to one row of the display panel 100, may be transmitted to the data driver 300 according to a horizontal synchronization signal Hsync. In other words, image data may be transmitted to the data driver 300 sequentially from the image data corresponding to the first row to the image data corresponding to the nth row by one row at a time for each Hsync.

After the image data corresponding to all of the rows of the display panel 100 are transmitted to the data driver 300, a vertical synchronization signal Vsync may be transmitted from the controller 500. If the Vsync is transmitted, the image data may be again transmitted to the data driver 300 sequentially from the image data corresponding to the first row of the display panel 100 according to the Hsync.

The controller 500 may be connected to the scan driver 400, the data driver 300 and the frame memory 200. The controller 500 may generate the control signal and may transmit the same to the scan driver 400, the data driver 300 or the frame memory 200. The controller 500 may generate Vsync, Hsync, etc. and may transmit the same to the scan driver 400 or the data driver 300. In addition, the controller 500 may generate the control signal that allows the frame memory 200 to externally receive and store image data and may then transmit the control signal to the frame memory 200.

Figure 3:
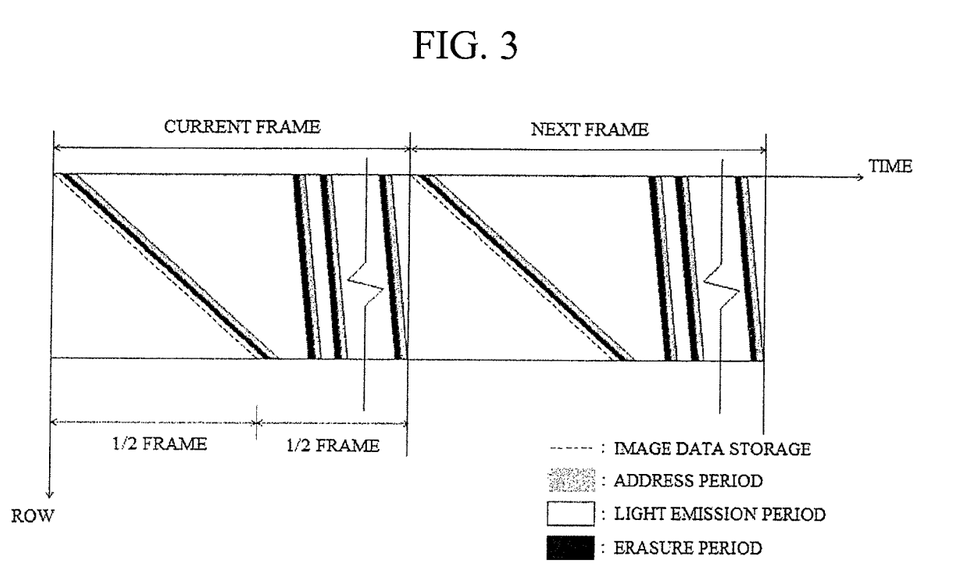
FIG. 3 is a time-scanning line graph illustrating timings of scan signals during two neighboring frames according to a first embodiment of the present invention.

FIG. 3 is a time-scanning line graph illustrating timings of scan signals during two neighboring frames according to a first embodiment of the present invention.

Referring to FIG. 3, the display device according to the first embodiment of the present invention may represent gray scales of an image by adjusting the emission period of pixels 101 within one frame. To this end, one frame may include a plurality of sub-fields. The gray scales may be represented by allowing each of the pixels 101 to emit light or not during a time period corresponding to each of the plurality of sub-fields.

Data signals of a plurality of data bits may be transmitted to one of the pixels 101 during a time period corresponding to one frame. For example, as the data signals, m data bits may be transmitted sequentially from the first to mth data bits during a time period corresponding to one frame. The ith data bit, where $1<=i<=m$, among the first to mth data bits may have a weight of $2^{i-1}$. A weight of each data bit may indicate a length of a relative emission period or a relative non-emission period within one frame. The least significant data bit of the data to be transmitted as the data signal during the time period corresponding to one frame may be the first data bit, and the most significant data bit may be the mth data bit.

According to the first embodiment of the present invention, one frame may include sub-fields one more than the data bits included in the data signals transmitted to one pixel 101 during the time period corresponding to one. That is, assuming that m data bits are transmitted as the data signals sequentially from the first to mth data bits, one frame may include (m+1) sub-fields. The (m+1) sub-fields may include first to (m+1)th sub-fields.

Each of the sub-fields may include an address period, a light emission period and an erasure period. In the address period of each sub-field, the scan signals may be transmitted to the respective rows of the display panel 100. In the following description, the scan signal transmitted to the display panel 100 in the address period of the ith sub-field, where $1<=i<=m+1$, will be referred to as an ith scan signal.

Whenever the scan signal is transmitted to each row of the display panel 100 during the address period, one of the plurality of data bits may be transmitted to the pixel 101 as the data signal. According to this embodiment, the mth data bit may be transmitted when the first scan signal is transmitted in the address period of the first sub-field. In addition, the (i−1)th data bit may be transmitted to the pixel 101 when the ith scan signal is transmitted in the address period of the ith sub-field, where $2<=i<=m+1$. That is, the mth data bit having the highest weight among the data bits may be transmitted to the pixel 101 when the first or (m+1)th scan signal is transmitted.

During one frame, the first sub-field may be arranged as the earliest sub-field and the (m+1)th sub-field may be arranged as the latest sub-field. That is, the first scan signal may be the earliest transmitted scan signal to each row of the display panel 100 and the (m+1)th scan signal may be the latest arranged scan signal. Therefore, among the plurality of data bits included in the data signal, the mth data bit having the highest weight may be earliest transmitted to each row of the display panel 100 and may be latest transmitted again during one frame.

The remaining second to mth sub-fields may be arranged between the first sub-field and the (m+1)th sub-field. The second to mth sub-fields may be arranged in any possible order. In other words, the second to mth scan signals may be transmitted after the first scan signal is transmitted and before the (m+1)th scan signal is transmitted. The second to mth scan signals may be transmitted in any possible order.

Lengths of address periods included in the first to (m+1)th sub-fields may be equal to each other.

The address periods of one sub-field may be arranged sequentially from the first to nth rows of the display panel 100. In other words, the scan signals and data bits for one sub-field may be transmitted sequentially from the first to nth rows of the display panel 100.

However, a total time taken for the scan signals and the data bits to be transmitted sequentially from the first row to the nth row of the display panel 100 is as follows.

The total time taken for the first scan signal for the first sub-field to be transmitted sequentially from the first row to the nth row of the display panel 100 may be longer than or equal to a time taken for the image data corresponding to one frame to be all stored in the frame memory 200. The time taken for the image data corresponding to one frame to be all stored in the frame memory 200 may be shorter than or equal to half of the time for one frame.

For example, assuming that a display device displays 60 frames per second, the time period corresponding to one frame may be 1/60 seconds. Therefore, the time taken for the image data corresponding to one frame to be all stored in the frame memory 200 may be shorter than or equal to 1/120 seconds. In addition, a total time taken for the first scan signal for the first sub-field to be transmitted sequentially from the first row to the nth row of the display panel 100 may be longer than or equal to 1/120 seconds.

A total time taken for the second to (m+1)th scan signals to be transmitted sequentially from the first to nth rows of the display panel 100 may be made to be as short as possible.

It is assumed that the frame memory 200 has a memory size enough to store only the image data corresponding to one frame. It is also assumed that the frame memory 200 may receive the image data corresponding to the current frame sequentially from the first to nth rows at the same time when the period of the current frame starts.

If the total time taken for the scan signals and the data bits to be transmitted sequentially from the first row to the nth row of the display panel 100 is shorter than the time taken for the image data corresponding to one frame to be all written in the frame memory 200, the following problem may arise.

The display panel 100 may emit light from some of the plurality of pixels 101 according to image data of the previous frame, and emit light from the other of the plurality of pixels 101 according to image data of the current frame. In other words, a phenomenon that an image appears to be torn, which is called a "tearing effect," may occur.

For example, it is assumed that the scan signals and data signals start to be transmitted sequentially from the first row of the display panel 100 after the frame memory 200 starts to receive the image data corresponding to the current frame. It is also assumed that transmitting of the scan signals and data signals sequentially from the first to nth row of the display panel 100, after the frame memory 200 completely receives all of the image data corresponding to the current frame. In this case, the total time taken for the scan signals and the data bits to be transmitted sequentially from the first row to the nth row of the display panel 100 may be shorter than the time taken for the image data corresponding to one frame to be all received by the frame memory 200.

It is assumed that when the scan signal and data signal are transmitted to the (k−1)th row of the display panel 100, where 1<k<n, the image data corresponding to the (k−1)th row of the current frame has already been written in the frame memory 200. It is also assumed that when the scan signal and data signal are transmitted to the kth row of the display panel 100, the image data corresponding to the kth row of the current frame has yet to be written on the frame memory 200.

The display panel 100 may emit light from the pixels 101 included in the first to (k−1)th rows of the display panel 100 according to the image data of the current frame. In addition, the display panel 100 may emit light from the pixels 101 included in the kth to nth rows of the display panel 100 according to the image data of the previous frame. Therefore, a phenomenon that an image appears to be torn, which is called a "tearing effect," may occur.

In the embodiment of the present invention, the frame memory 200 receives the image data corresponding to the current frame sequentially from the first to nth rows at the same time when the period of the current frame starts. In addition, immediately after the frame memory 200 starts to receive the image data corresponding to the current frame, the first scan signal for the first sub-field may start to be transmitted to the display panel 100. In addition, the total time taken for the first scan signal for the first sub-field to be transmitted sequentially from the first to nth rows of the display panel 100 may be longer than or equal to the time taken for the image data corresponding to the current frame to be all received by the frame memory 200.

Therefore, in the display device according to this embodiment, as shown in FIG. 3, the first to (m+1)th scan signals may be transmitted to the respective rows of the display panel 100 after the image data corresponding to the respective rows of the current frame are received by the frame memory 200. That is, for all of the rows of the display panel 100, the first to (m+1)th scan signals may be all transmitted to the display panel 10 after the image data corresponding to the current frame are received by the frame memory 200. Therefore, a tearing effect can be prevented.

During a light emission period of each sub-field, the pixel 101 may emit light or may not emit light. The pixel 101 may emit light or may not emit light during the light emission period according to the value of the data bit transmitted through the data lines D1 to Dm when the scan signal is transmitted during the address period. For example, if the value of the transmitted data bit is at a low level, the pixel 101 may emit light during the light emission period. If the value of the transmitted data bit is at a high level, the pixel 101 may not emit light during the light emission period.

In other words, when the scan signal is transmitted during the address period, the display panel 100 is controlled to emit light from the pixel 101 or not according to the values of the data bits transmitted from the data lines D1 to Dm. In addition, an emission state or a non-emission state of the pixel 101 may be sustained according to the values of the data bits during the light emission period.

Therefore, a length of the light emission period of each of the first to (m+1)th sub-fields may indicate an emission period or a non-emission period of each sub-field. Lengths of light emission periods included in the first to (m+1)th sub-fields may be as follows.

The lengths of the light emission periods included in the second to mth sub-fields may be proportional to weights of the data bits transmitted during the address periods included in the second to mth sub-fields. In other words, the (i−1th data bit may be transmitted during the address period of the ith sub-field, where $2<=i<=m$, and the length of the light emission period of the ith sub-field is proportional to $2^{i-2}$. For example, when m is 3 or greater, the light emission period of the third sub-field may be two times longer than the light emission period of the second sub-field, and the light emission period of the mth sub-field may be $2^{m-2}$ times longer than the light emission period of the second sub-field.

The lengths of the respective light emission periods included in the second to mth sub-fields may be equal to each other for all of the rows of the display panel 100.

The length of the light emission period of the first sub-field or the length of the light emission period of the (m+1)th sub-field for each of the rows in the display panel 100 may be different from each other. However, a sum of the length of the light emission period of the first sub-field and the length of the light emission period of the (m+1)th sub-field for each of the rows in the display panel 100 may be equal to each other.

In addition, the sum of the lengths of the light emission periods of the first and (m+1)th sub-fields may be equal to the weight of the data bit transmitted during the address period of the first sub-field or the (m+1)th sub-field. As described above, during both of the address periods of the first and (m+1)th sub-fields, the mth data bit may be transmitted. Therefore, the sum of the lengths of the light emission periods of the first and (m+1)th sub-fields may be proportional to $2^{m-1}$.

For example, when m is 3 or greater, the sum of the lengths of the light emission periods of the first and (m+1)th sub-fields may be $2^{m-1}$ times greater than the length of the light emission period of the second sub-field. In addition, the sum of the lengths of the light emission periods of the first and (m+1)th sub-fields may be two times greater than the length of the light emission period of the mth sub-field.

Referring to FIG. 3, as described above, a total time taken for the first scan signal for the first sub-field to be transmitted sequentially from the first to nth rows of the display panel 100 may be longer than or equal to a time taken for the image data corresponding to one frame to be all written in the frame memory 200. On the other hand, a total time taken for the second to (m+1)th scan signals to be transmitted sequentially from the first to nth rows of the display panel 100 may be made to be as short as possible.

Therefore, as shown in FIG. 3, the length of the light emission period of the first sub-field may be decreased for the respective rows of the display panel 100 gradually from the first to nth rows of the display panel 100. In addition, the length of the light emission period of the (m+1)th sub-field may be increased for the respective rows of the display panel 100 gradually from the first to nth rows of the display panel 100. In addition, a sum of the length of the light emission period of the first sub-field and the length of the light emission period of the (m+1)th sub-field for each of the rows in the display panel 100 may be equal to each other.

In the aforementioned display device according to this embodiment, during one frame, a set or predetermined data bit may be earliest transmitted to each row of the display panel 100 and may be latest arranged again. The set or predetermined data bit may be a data bit having the highest weight among the plurality of data bits each having a weight to represent gray scales of an image. Therefore, a total of lengths of the light emission periods for the plurality of data bits may be proportional to weights of the respective data bits. In addition, after the image data corresponding to the current frame are received by the frame memory 200, all of the scan signals may be transmitted to the display panel 100 for all of the rows of the display panel 100. Therefore, a tearing effect can be prevented by using only the frame memory 200 while maintaining display quality of the display device.

In an erasure period of each sub-field, the data signals stored in the capacitor Cst of the pixel 101 may be erased. Even if an emission state of the pixel 101 is sustained during the light emission period, emission of the pixel 101 may be interrupted through the erasure period. Lengths of the respective erasure periods included in the first to (m+1)th sub-fields may be the same with each other.

Figure 4:
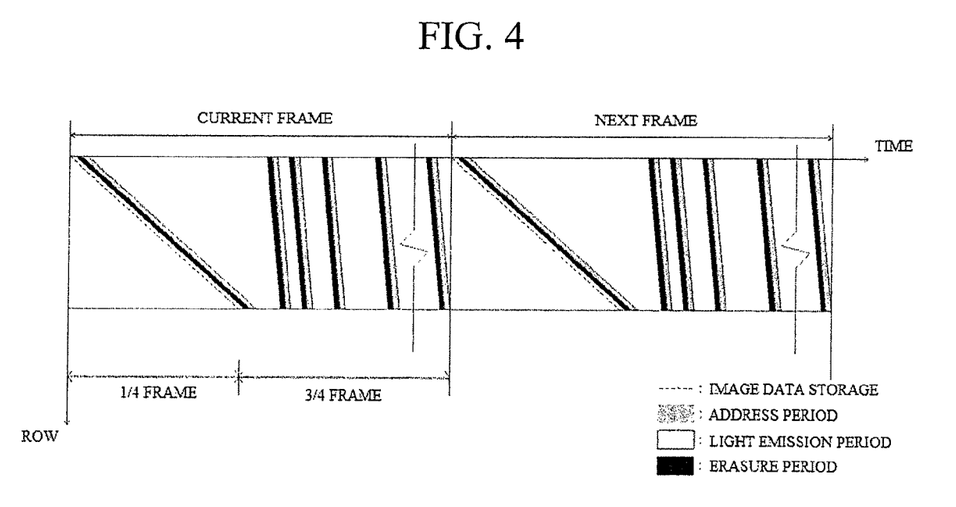
FIG. 4 is a time-scanning line graph illustrating timings of scan signals during two neighboring frames according to a second embodiment of the present invention.

FIG. 4 is a time-scanning line graph illustrating timings of scan signals during two neighboring frames according to a second embodiment of the present invention.

Referring to FIG. 4, in the second embodiment of the present invention, a time taken for the image data corresponding to one frame to be all written in a frame memory 200 may be shorter than or equal to ¼ of a time period corresponding to one frame.

For example, assuming that the display device displays 60 frames per second, the time period corresponding to one frame may be 1/60 seconds. Therefore, the time taken for the image data corresponding to one frame to be all written in the frame memory 200 may be shorter than or equal to 1/240 seconds. In addition, a total time taken for the first scan signal for the first sub-field to be transmitted sequentially from the first row to the nth row of the display panel 100 may be longer than or equal to 1/240 seconds.

Since the remaining contents are the same as those of the first embodiment, repeated descriptions will be omitted.

Figure 5:
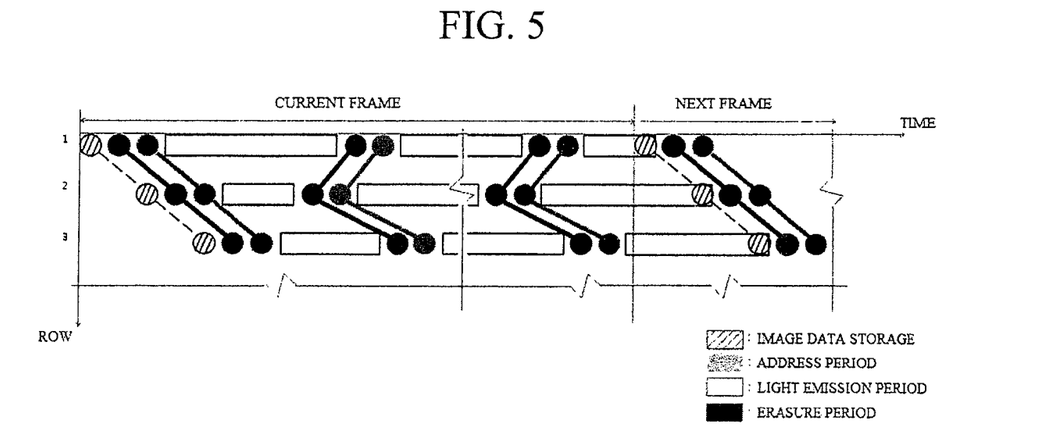
FIG. 5 is a time-scanning line graph illustrating timings of scan signals during two neighboring frames according to a third embodiment of the present invention.

FIG. 5 is a time-scanning line graph illustrating timings of scan signals during two neighboring frames according to a third embodiment of the present invention.

Referring to FIG. 5, in the third embodiment of the present invention, address periods of first sub-fields may be arranged sequentially from first to nth rows of a display panel 100. In other words, scan signals and data bits for the first sub-field may be transmitted sequentially from first to nth rows of the display panel 100.

A total time taken for the first scan signal for the first sub-field to be transmitted sequentially from the first to nth rows of the display panel 100 may be shorter than or equal to a time taken for the image data corresponding to one frame to be all written in a frame memory 200. The time taken for the image data corresponding to one frame to be all written in the frame memory 200 may be shorter than or equal to half of the time period corresponding to one frame.

The frame memory 200 may receive the image data corresponding to the current frame sequentially from the first to nth rows at the same time when the period of the current frame starts. In addition, immediately after the frame memory 200 starts to receive the image data corresponding to the current frame, the first scan signal for the first sub-field may start to be transmitted to the display panel 100.

However, unlike in the first embodiment, in the third embodiment, address periods of the second to (m+1)th sub-fields may be arranged in an arbitrary order from the first to Ith rows of the display panel 100.

A length of the first sub-field for a certain row included in the display panel 100 may vary according to the timing sequence of the address periods of the first and second sub-fields for the certain row.

For example, referring to FIG. 5, the address period of the second sub-field for the first row may be arranged later than that of the second sub-field for the second row. In addition, the address period of the second sub-field for the first row may be arranged earlier than that of the second sub-field for the third row. The light emission period of the first sub-field for the third row may be longer than that of the first sub-field for the second row and may be shorter than that of the first sub-field for the first row.

In addition, a length of the light emission period of the (m+1)th sub-field for a certain row included in the display panel 100 may vary according to the timing positions of the address period of the (m+1)th sub-field for the certain row and the address period of the first sub-field for the next frame.

However, a sum of the length of the light emission period of the first sub-field and the length of the light emission period of the (m+1)th sub-field, for each of the rows in the display panel 100, is equal to each other. Therefore, the timing sequence in which the address periods of the (m+1)th sub-fields for the respective rows included in the display panel 100 are arranged may be the same as that of the second sub-fields for the respective rows included in the display panel 100.

For example, referring to FIG. 5, the address period of the (m+1)th sub-field for the first row may be arranged later than that of the (m+1)th sub-field for the second row. In addition, the address period of the (m+1)th sub-field for the first row may be arranged earlier than that of the (m+1)th sub-field for the third row. A sum of the lengths of the light emission periods of the first and (m+1)th sub-fields for a certain row may be equal to that for the other rows.

Since the remaining contents are the same as those of the first embodiment, repeated descriptions will be omitted.

Figure 6:
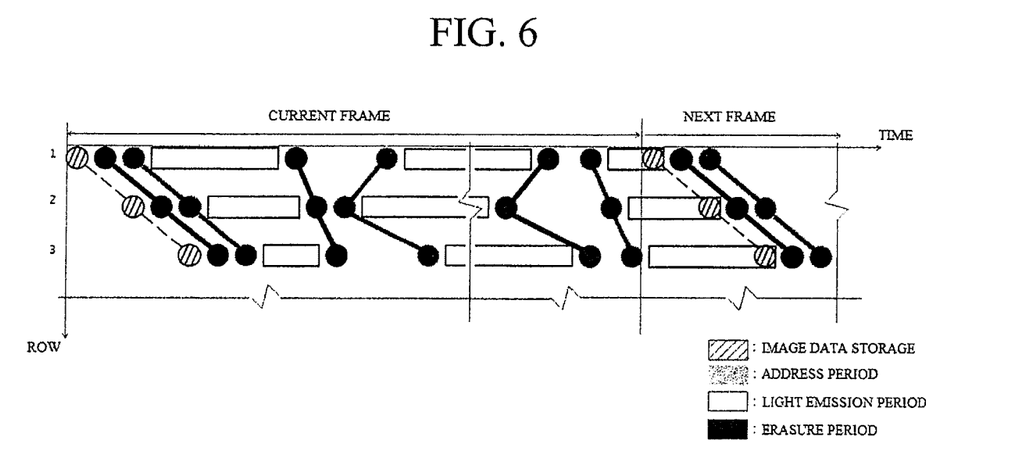
FIG. 6 is a time-scanning line graph illustrating timings of scan signals during two neighboring frames according to a fourth embodiment of the present invention.

FIG. 6 is a time-scanning line graph illustrating timings of scan signals during two neighboring frames according to a fourth embodiment of the present invention.

Referring to FIG. 6, in the fourth embodiment of the present invention, address periods of first sub-fields may be arranged sequentially from first to nth rows of a display panel 100. In other words, scan signals and data bits for the first sub-field may be transmitted sequentially from first to nth rows of the display panel 100.

A total time taken for the first scan signal for the first sub-field to be transmitted sequentially from the first to nth rows of the display panel 100 may be shorter than or equal to a time taken for the image data corresponding to one frame to be all written in a frame memory 200. The time taken for the image data corresponding to the one frame to be all written in the frame memory 200 may be shorter than or equal to half of the time period corresponding to the one frame.

The frame memory 200 may receive the image data corresponding to the current frame sequentially from the first to nth rows at the same time when the period of the current frame starts. In addition, immediately after the frame memory 200 starts to receive the image data corresponding to the current frame, the first scan signal for the first sub-field may start to be transmitted to the display panel 100.

Also, in this embodiment, the address periods of the (m+1)th sub-field may be arranged sequentially from the first to nth rows of the display panel 100. In other words, scan signals and data bits for the (m+1)th sub-field may be transmitted sequentially from first to nth rows of the display panel 100.

A total time taken for the (m+1)th scan signal to be transmitted from the first to nth rows of the display panel 100 may be made to be as short as possible.

Erasure periods of the first sub-field may be arranged sequentially from the first to nth rows of a display panel 100. In other words, a time length between a timing position at which the erasure period of the first sub-field for the first row and a timing position at which the erasure period of the first sub-field for the nth row, may be equal to a time length between a timing position at which the (m+1)th scan signal is transmitted to the first row and a timing position at which the (m+1)th scan signal is transmitted to the nth row.

However, unlike in the first embodiment, in the fourth embodiment, address periods of the second to mth sub-fields may be arranged in an arbitrary order from the first to nth rows of the display panel 100.

After the erasure period of the first sub-field starts and before the light emission period of the second sub-field, a non-emission state of the pixel 101 may be sustained. In addition, after the erasure period of the mth sub-field starts and before the light emission period of the (m+1)th sub-field, a non-emission state of the pixel 101 may be sustained.

The length of the light emission period of the first sub-field or the length of the light emission period of the (m+1)th sub-field for each of the rows in the display panel 100 may be different from each other. However, a sum of the length of the light emission period of the first sub-field and the length of the light emission period of the (m+1)th sub-field for each of the rows in the display panel 100 may be equal to each other.

For example, referring to FIG. 6, lengths of the light emission periods of the first sub-field for the respective rows included in the display panel 100 may be decreased gradually from the first to nth rows of the display panel 100. In addition, lengths of the light emission periods of the (m+1)th sub-field for the respective rows included in the display panel 100 may be increased gradually from the first to nth rows of the display panel 100. In addition, a sum of the lengths of the light emission periods of the first and (m+1)th sub-fields for the certain row included in the display panel 100 may be equal to that for the other rows included in the display panel 100.

Since the remaining contents are the same as those of the first embodiment, repeated descriptions will be omitted.

In the aforementioned display device according to this embodiment, during one frame, a set or predetermined data bit may be earliest transmitted to each row of the display panel 100 and may be latest arranged again. The set or predetermined data bit may be a data bit having the highest weight among the plurality of data bits each having a weight to represent gray scales of an image. Therefore, a total of lengths of the light emission periods included in the plurality of data bits may be proportional to weights of the respective data bits. In addition, after the image data corresponding to the current frame are received by the frame memory 200, all of the scan signals may be transmitted to the display panel 100 for all of the rows of the display panel 100. Therefore, a tearing effect can be prevented by using only the frame memory 200 while maintaining display quality of the display device.

While the present invention has been particularly shown and described with reference to exemplary embodiments thereof, it will be understood by those of ordinary skill in the art that various changes in form and details may be made therein without departing from the spirit and scope of the present invention as defined by the following claims. It is therefore desired that the present embodiments be considered in all respects as illustrative and not restrictive, reference being made to the appended claims rather than the foregoing description to indicate the scope of the invention, and equivalents thereof.

What is claimed is:

1. A display device for displaying an image by dividing one frame into a plurality of sub-fields, the display device comprising:
 a display panel comprising a plurality of pixel rows;
 a driver connected to the display panel and for transmitting scan signals or data signals to the display panel;
 a frame memory connected to the driver, for storing externally received image data, and for transmitting at least some of the image data to the driver; and
 a controller connected to the driver and the frame memory, for generating a control signal and transmitting the control signal to the driver or the frame memory,
 wherein each of the sub-fields includes an address period in which the scan signals are transmitted to the respective pixel rows,
 wherein the frame memory is configured to receive at least some of the image data corresponding to a current frame from the respective pixel rows at the same time when the period of the current frame starts; and
 wherein the driver is configured to start to transmit scan signals for the plurality of sub-fields to the display panel after the frame memory starts to receive the image data corresponding to the current frame,
 the controller is configured to transmit the control signal to the driver to transmit the scan signals to the pixel rows during the current frame such that the scan signals corresponding to the current frame are transmitted after, among the image data corresponding to the current frame, the image data corresponding to the pixel rows are stored in the frame memory.

2. The display device of claim 1, wherein the controller is configured to transmit the control signal to the driver such that a total time taken for the scan signals to be transmitted to all of the plurality of pixel rows during the address period of the sub-field arranged earliest during the current frame, among the plurality of sub-fields, is longer than or equal to a time taken for the image data corresponding to the current frame to be all stored in the frame memory.

3. The display device of claim 2, wherein the time taken for the image data corresponding to the current frame to be all stored in the frame memory is shorter than or equal to half of the time period corresponding to one frame.

4. The display device of claim 2, wherein the time taken for the image data corresponding to the current frame to be all stored in the frame memory is shorter than or equal to one fourth of the time period corresponding to one frame.

5. The display device of claim 1, wherein the driver is configured to transmit the data signal to the display panel for the address period of each of the sub-fields; the plurality of sub-fields comprise first to nth sub-fields, where n is a natural number of 2 or greater, arranged according to the timing sequence within the current frame; and the data signal transmitted to the display panel during the address period of the first sub-field and the data signal transmitted to the display panel during the address period of the nth sub-field are equal to each other.

6. The display device of claim 1, wherein the driver is configured to transmit the data signal to the display panel for the address period of each of the sub-fields, and the driver is configured to transmit one of m data bits, where m is a natural number of 2 or greater, to the display panel.

7. The display device of claim 6, wherein the plurality of sub-fields comprise (m+1) sub-fields, the (m+1) sub-fields comprise first to (m+1)th sub-fields arranged according to the timing sequence within the current frame, and the data bit transmitted to the display panel during the address period of the first sub-field and the data bit transmitted to the display panel during the address period of the (m+1)th sub-field are equal to each other.

8. The display device of claim 7, wherein the m data bits have weights, respectively, and the data bit transmitted to the display panel during the address period of the first sub-field and the data bit transmitted to the display panel during the address period of the (m+1)th sub-field have the highest weight among the m data bits.

9. The display device of claim 8, wherein the m data bits comprise first to mth data bits, and an ith data bit, where $1 \leq i \leq m$, among the first to mth data bits, has a weight of $2^{i-1}$.

10. The display device of claim 7, wherein each of the pixel rows comprises one or more pixels, and each of the first to (m+1)th sub-fields further includes a light emission period in which the pixels emit light or not according to the data bit transmitted to the display panel during the address period included in each of the first to (m+1)th sub-fields.

11. The display device of claim 10, wherein a sum of the length of the light emission period of the first sub-field and the length of the light emission period of the (m+1)th sub-field, for each of the pixel rows, is equal to each other.

12. The display device of claim 11, wherein the length of the light emission period of the first sub-field or the length of the light emission period of the (m+1)th sub-field, for each of the pixel rows, is different from each other.

13. A display device for displaying an image by dividing one frame into a plurality of sub-fields, the display device comprising:
a display panel comprising a plurality of pixel rows;
a driver connected to the display panel and for transmitting scan signals or data signals to the display panel;
a frame memory connected to the driver, for storing externally received image data, and for transmitting at least some of the image data to the driver; and
a controller connected to the driver and the frame memory, generating a control signal and transmitting the control signal to the driver or the frame memory,
wherein each of the sub-fields includes an address period in which the scan signals are transmitted to the respective pixel rows, the controller is configured to transmit the control signal to the driver to transmit the scan signals to the pixel rows during a current frame such that the scan signals corresponding to the current frame are transmitted after, among the image data corresponding to the current frame, the image data corresponding to the pixel rows are stored in the frame memory,
wherein driver is configured to transmit the data signal to the display panel for the address period of each of the sub-fields, and the driver is configured to transmit one of m data bits, where m is a natural number of 2 or greater, to the display panel,
wherein the plurality of sub-fields comprise (m+1) sub-fields, the (m+1) sub-fields comprise first to (m+1)th sub-fields arranged according to the timing sequence within the current frame, and the data bit transmitted to the display panel during the address period of the first sub-field and the data bit transmitted to the display panel during the address period of the (m+1)th sub-field are equal to each other,
wherein each of the pixel rows comprises one or more pixels, and each of the first to (m+1)th sub-fields further includes a light emission period in which the pixels emit light or not according to the data bit transmitted to the display panel during the address period included in each of the first to (m+1)th sub-fields,
wherein the m data bits have weights, respectively, lengths of the light emission periods of the second to mth sub-fields are proportional to weights of the data bits transmitted to the display panel during the address periods included in the second to mth sub-fields, and a sum of the lengths of the light emission periods of the first and (m+1)th sub-fields is proportional to the weight of the data bit transmitted to the display panel during the address period included in the first sub-field or the (m+1)th sub-field.

14. The display device of claim 13, wherein the data bit transmitted to the display panel during the address period of the first sub-field and the data bit transmitted to the display panel during the address period of the (m+1)th sub-field have the highest weight among the m data bits.

15. A display device for displaying an image by dividing one frame into a plurality of sub-fields, the display device comprising:
a display panel comprising a plurality of pixel rows;
a driver connected to the display panel and for transmitting scan signals or data signals to the display panel;
a frame memory connected to the driver, for storing externally received image data, and for transmitting at least some of the image data to the driver; and
a controller connected to the driver and the frame memory, for generating a control signal, and for transmitting the control signal to the driver or the frame memory,
wherein the frame memory is configured to receive at least some of the image data corresponding to a current frame from the respective pixel rows at the same time when the period of the current frame starts;
wherein the driver is configured to start to transmit scan signals for the plurality of sub-fields to the display panel after the frame memory starts to receive the image data corresponding to the current frame; and,
wherein the controller is configured to transmit the control signal to the driver such that a total time taken for the scan signals to be transmitted to all of the plurality of pixel rows during an address period of the sub-field arranged earliest during the current frame, among the plurality of sub-fields, is longer than or equal to a time taken for the image data corresponding to the current frame to be all stored in the frame memory.

16. The display device of claim 15, wherein the driver is configured to start transmitting all of the scan signals transmitted during the current frame to the display panel after the frame memory starts to receive the image data corresponding to the current frame.

17. The display device of claim 15, wherein the time taken for the image data corresponding to the current frame to be all stored in the frame memory is shorter than or equal to half of the time period corresponding to one frame.

18. The display device of claim 15, wherein the driver is configured to transmit the data signal to the display panel for the address period of each of the sub-fields;
wherein the driver is configured to transmit one of m data bits, where m is a natural number of 2 or greater, to the display panel; wherein the plurality of sub-fields include first to (m+1)th sub-fields, arranged according to the timing sequence within the current frame; and wherein the data signal transmitted to the display panel during the address period of the first sub-field and the data signal transmitted to the display panel during the address period of the (m+1)th sub-field are equal to each other.

19. The display device of claim 18, wherein each of the pixel rows includes one or more pixels, each of the first to (m+1)th sub-fields further comprises a light emission period in which the pixels emit light or not according to the data bit transmitted to the display panel during the address period included in each of the first to (m+1)th sub-fields, and a sum of the length of the light emission period of the first sub-field and the length of the light emission period of the (m+1)th sub-field for each of the pixel rows is equal to each other.

20. A display device for displaying an image by dividing one frame into a plurality of sub-fields, the display device comprising:
- a display panel comprising a plurality of pixel rows;
- a driver connected to the display panel and for transmitting scan signals or data signals to the display panel;
- a frame memory connected to the driver, for storing externally received image data, and for transmitting at least some of the image data to the driver; and
- a controller connected to the driver and the frame memory, for generating a control signal, and for transmitting the control signal to the driver or the frame memory,
- wherein the controller is configured to transmit the control signal to the driver such that a total time taken for the scan signals to be transmitted to all of the plurality of pixel rows during an address period of the sub-field arranged earliest during a current frame, among the plurality of sub-fields, is longer than or equal to a time taken for the image data corresponding to the current frame to be all stored in the frame memory,
- wherein the driver is configured to transmit the data signal to the display panel for the address period of each of the sub-fields; wherein the driver is configured to transmit one of m data bits, where m is a natural number of 2 or greater, to the display panel; wherein the plurality of sub-fields include first to (m+1)th sub-fields, arranged according to the timing sequence within the current frame; and wherein the data signal transmitted to the display panel during the address period of the first sub-field and the data signal transmitted to the display panel during the address period of the (m+1)th sub-field are equal to each other,
- wherein each of the pixel rows includes one or more pixels, each of the first to (m+1)th sub-fields further comprises a light emission period in which the pixels emit light or not according to the data bit transmitted to the display panel during the address period included in each of the first to (m+1)th sub-fields, and a sum of the length of the light emission period of the first sub-field and the length of the light emission period of the (m+1)th sub-field for each of the pixel rows is equal to each other,
- wherein the m data bits have weights, respectively, lengths of the light emission periods of the second to mth sub-fields are proportional to weights of the data bits transmitted to the display panel during the address periods included in the second to mth sub-fields, and a sum of the lengths of the light emission periods of the first and (m+1)th sub-fields is proportional to the weight of the data bit transmitted to the display panel during the address period included in the first sub-field or the (m+1)th sub-field, and the data bit transmitted to the display panel during the address period of the first sub-field and the data bit transmitted to the display panel during the address period of the (m+1)th sub-field have the highest weight among the m data bits.

21. A display device for displaying an image by dividing one frame into a plurality of sub-fields, the display device comprising:
- a display panel comprising a plurality of pixel rows;
- a driver connected to the display panel and for transmitting scan signals or data signals to the display panel;
- a frame memory connected to the driver, for storing externally received image data, and for transmitting at least some of the image data to the driver; and
- a controller connected to the driver and the frame memory, for generating a control signal and transmitting the control signal to the driver or the frame memory,
- wherein each of the sub-fields includes an address period in which the scan signals are transmitted to the respective pixel rows, the controller is configured to transmit the control signal to the driver to transmit the scan signals to the pixel rows during a current frame such that the scan signals corresponding to the current frame are transmitted after, among the image data corresponding to the current frame, the image data corresponding to the pixel rows are stored in the frame memory,
- wherein a time taken for the image data corresponding to the current frame to be all stored in the frame memory is shorter than or equal to half of the time period corresponding to one frame.

* * * * *